UNITED STATES PATENT OFFICE.

ALFRED SANG, OF ST. CLOUD, FRANCE.

METHOD OF MANUFACTURING BRASS-DUST.

946,738.  Specification of Letters Patent.  Patented Jan. 18, 1910.

No Drawing.  Application filed May 6, 1909. Serial No. 494,409.

*To all whom it may concern:*

Be it known that I, ALFRED SANG, a subject of the King of Great Britain, residing in St. Cloud, France, have invented an Improvement in the Method of Manufacturing Brass-Dust, of which the following is a full, clear, and exact description.

My invention has relation to the manufacture of brass dust to be used for the coating of metals by cementation, for the purpose of providing a malleable brass coating which will be perfectly homogeneous and non-porous, and which, under certain conditions and for certain purposes, is superior to a zinc coating as usually provided.

In accordance with my invention, I take a solution of commercial copper sulfate of any desired strength and add zinc dust very slowly thereto, preferably stirring during the operation. The addition of the zinc dust causes precipitation of the copper in the form of a very fine purplish brown powder, the zinc going into solution as sulfate of zinc. The zinc dust is added until the solution has a white appearance which marks the end of the operation. I then filter the copper powder thus produced, the filtrate being sulfate of zinc, which is a commercial product that can be used in electrogalvanizing and for other purposes. The copper dust thus produced contains a certain proportion of copper oxid and possibly also copper carbonate and usually other impurities. If desired, this copper dust may be washed, but as a rule, this is not necessary. It is then dried carefully under conditions to prevent undue increase in the amount of oxid, the copper in this finely divided state being readily oxidizable at moderate temperatures. I mix the copper dust thus produced with zinc dust in any desired proportion and put this mixture in a retort and heat it a short time at a moderate temperature, preferably altering the position of the retort or otherwise producing sufficient agitation to result in a thorough admixture of the zinc and copper dust. The temperature employed should not reach the point at which the zinc and copper would form into beads of brass, but must, in all cases, be kept below this point. After the retort has cooled, the contents are in the form of a green dust, the chemical composition of which is brass mixed with various oxids of brass and zinc, and possibly other impurities, but is, in the main, brass with a superficial film of impurity which gives the substance this green color. The dust so produced may be used in a manner similar to zinc dust in the well known sherardizing process, although a somewhat higher temperature will be required than is ordinarily employed in sherardizing with zinc dust as the coating material.

The copper dust used in the formation of the brass dust may be produced in other ways than by precipitation from a solution of copper sulfate, as above described, and I do not limit myself thereto. The method described, however, forms a convenient and cheap method of producing the copper dust.

I claim:

1. The method of manufacturing brass dust, which consists in mixing copper dust and zinc dust in a suitable retort or vessel and heating them to a moderate temperature, substantially as described.

2. The method of manufacturing brass dust, which consists in mixing copper and zinc dust and heating them to a temperature below that at which the zinc and copper form into beads of brass, substantially as described.

3. The method of manufacturing brass dust, which consists in precipitating copper dust from a copper sulfate solution, and then mixing the copper dust with zinc dust and heating the mixture, substantially as described.

4. The method of manufacturing brass dust, which consists in precipitating copper dust from a solution of copper sulfate by the admixture of zinc dust therewith, filtering and drying the precipitated copper dust, and then mixing the copper dust with zinc dust and heating the mixture, substantially as described.

In testimony whereof, I have hereunto set my hand.

ALFRED SANG.

Witnesses:
HENRY L. COLLINS,
W. C. WINTERHALTER.